United States Patent
Ng et al.

(10) Patent No.: US 9,128,560 B2
(45) Date of Patent: Sep. 8, 2015

(54) BORDERLESS TOUCH PANEL DESIGN

(71) Applicant: STMicroelectronics Asia Pacific Pte. Ltd., Singapore (SG)

(72) Inventors: Chee Yu Ng, Singapore (SG); Praveesh Chandran, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 226 days.

(21) Appl. No.: 13/738,081

(22) Filed: Jan. 10, 2013

(65) Prior Publication Data
US 2014/0191978 A1    Jul. 10, 2014

(51) Int. Cl.
*G06F 3/044* (2006.01)
*G06F 3/041* (2006.01)

(52) U.S. Cl.
CPC .............. *G06F 3/0416* (2013.01); *G06F 3/044* (2013.01)

(58) Field of Classification Search
CPC ............................ G06F 3/0416; G06F 3/044
USPC ................................................. 345/173–179
See application file for complete search history.

(56) References Cited

U.S. PATENT DOCUMENTS

| | | |
|---|---|---|
| 5,650,597 A | 7/1997 | Redmayne |
| 2010/0149125 A1 | 6/2010 | Klinghult et al. |
| 2010/0149126 A1 | 6/2010 | Futter |
| 2011/0001717 A1 | 1/2011 | Hayes et al. |
| 2011/0080370 A1* | 4/2011 | Wu .................. 345/174 |

OTHER PUBLICATIONS

Camacho et al.; "Designing Touch Sensing Electrodes"; Jul. 2011; Freescale Semiconductor; Rev. 4.*

* cited by examiner

*Primary Examiner* — Premal Patel
(74) *Attorney, Agent, or Firm* — Gardere Wynne Sewell LLP

(57) ABSTRACT

A borderless touchscreen panel includes a first conductive layer having rows of capacitive sensors and receiving traces, and a second conductive layer having columns of sensor bars and transmitting traces. The capacitive sensors are coupled to control circuitry via the receiving traces, and the sensor bars are coupled to the control circuitry via the transmitting traces. Peripheral sensor bars are disposed over the receiving traces such that the receiving traces can be routed within an active portion of the borderless touchscreen panel without obstructing its touch-detection capabilities. Furthermore, the receiving traces are comprised of a transparent material such as indium tin oxide, and therefore do not obstruct the display capabilities of the active portion. Thus, there is no need for an inactive border region since the receiving traces are disposed within the active portion without obstructing either the touch-detection or display capabilities of the borderless touchscreen panel.

14 Claims, 7 Drawing Sheets

BORDERLESS TOUCH PANEL DESIGN

FIELD OF THE INVENTION

The present disclosure generally relates to capacitive touchscreen panels and, more particularly, to an implementation of a capacitive touchscreen panel that eliminates a border region surrounding the touchscreen panel and increases the size of the active portion of the touchscreen panel.

BACKGROUND

Touchscreen panels implement sensing circuitry to detect a user touch on the display panel. In general, the circuitry includes routing circuitry (e.g., traces) for connecting sensing nodes or other touch-detection circuitry to a controller. In conventional touchscreen panels, this routing circuitry is disposed along the outer edges of the touchscreen panel, thereby defining a border that renders the outer edges of the touchscreen panel inactive (i.e., unusable for touch detection and/or visual display purposes). This border may be undesirable, for example, because it reduces the size of the active portion of the touchscreen panel.

SUMMARY

The present disclosure provides a borderless touchscreen panel, comprising: a plurality of transmit electrodes extending in a first direction, including a first transmit electrode and a last transmit electrode; and a plurality of sensing electrodes extending in a second direction substantially perpendicular to the first direction, wherein a first subset of the plurality of sensing electrodes are coupled to receiving traces routed beneath the first transmit electrode and extending in the first direction along the length of the first transmit electrode, and a second subset of the plurality of sensing electrodes are coupled to receiving traces routed beneath the last transmit electrode and extending in the first direction along the length of the last transmit electrode.

In another embodiment, the present disclosure provides a borderless touchscreen panel, comprising: a first layer comprising rows of series-connected sensing electrodes; a second layer comprising a plurality of transmit electrodes, including a first transmit electrode and a last transmit electrode, the plurality of transmit electrodes extending in a first direction substantially perpendicular to the rows of series-connected sensing electrodes, wherein the first layer further comprises: a first set of receiving traces routed beneath the first transmit electrode and extending in the first direction along a length of the first transmit electrode, the first set of receiving traces coupled to a first subset of the rows of series-connected sensing electrodes, and a second set of receiving traces routed beneath the last transmit electrode and extending in the first direction along a length of the last transmit electrode, the second set of receiving traces coupled to a second subset of the rows of series-connected sensing electrodes.

In yet another embodiment, the present disclosure provides a borderless touchscreen panel, comprising: a plurality of rows of series-connected sensing electrodes; a plurality of transmit electrodes extending in a first direction substantially perpendicular to the rows of series-connected sensing electrodes, the plurality of transmit electrodes including: a last transmit electrode, the last transmit electrode operable during a first mode to receive a first drive signal, and a first transmit electrode, the first transmit electrode operable during a second mode to receive a second drive signal; a first set of receiving traces routed beneath the first transmit electrode and extending in the first direction along a length of the first transmit electrode, the first set of receiving traces coupled to a first subset of the plurality of rows of series-connected sensing electrodes and operable during the first mode to provide first sense signals from the first subset of the plurality of series-connected sensing electrodes; and a second set of receiving traces routed beneath the last transmit electrode and extending in the first direction along a length of the last transmit electrode, the second set of receiving traces coupled to a second subset of the plurality of rows of series-connected sensing electrodes and operable during the second mode to provide second sense signals from the second subset of the plurality of series-connected sensing electrodes.

The foregoing and other features and advantages of the present disclosure will become further apparent from the following detailed description of the embodiments, read in conjunction with the accompanying drawings. The detailed description and drawings are merely illustrative of the disclosure, rather than limiting the scope of the invention as defined by the appended claims and equivalents thereof.

BRIEF DESCRIPTION OF DRAWINGS

Embodiments are illustrated by way of example in the accompanying figures not necessarily drawn to scale, in which like numbers indicate similar parts, and in which.

DETAILED DESCRIPTION OF THE EMBODIMENTS

Figure 1:
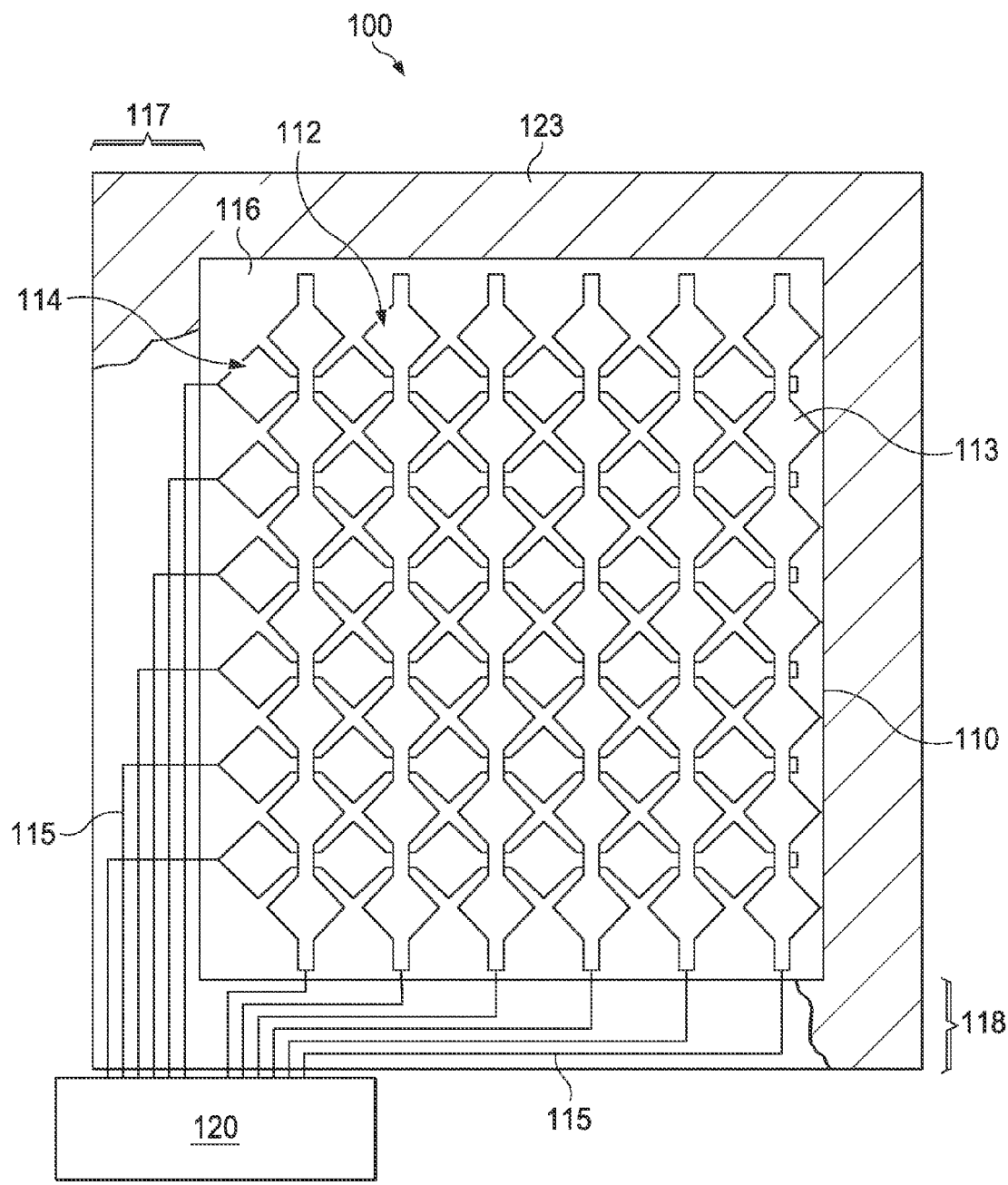
FIG. 1 illustrates an example of a bordered touchscreen panel.

FIG. 1 illustrates an example of a touchscreen panel 100, such as that typically installed in an electronic device such as a smart phone, GPS device, tablet computer, mobile media player, remote control device, or any other devices capable of using a touchscreen panel. The touchscreen panel 100 includes an active portion 110 capable of displaying content and detecting a user touch. Disposed within the perimeter of the active portion 110, the touchscreen panel 100 includes first and second conductive layers 112 and 114 separated by a dielectric layer 116, wherein each row or column of conducting elements of each of the conductive layers 112 and 114 includes a series of interconnected capacitive-sensing nodes 113. Each row or column of the conductive layers 112 and 114 is coupled to one of a set of conductive traces 115 that are, in turn, coupled to control circuitry 120. The control circuitry 120 may include circuitry for providing current to the conductive layers 112 and 114 and detecting signals generated by the capacitive-sensing nodes 113. The control circuitry 120 may also include logic circuitry for processing signals and conveying touch information to other parts of the electronic device, such as a processor.

As shown in FIG. 1, the conductive traces 115 occupy space along the perimeter of the touchscreen panel 100, resulting in border areas 117 and 118. The border areas 117 and 118 provide a region where the conductive traces 115 may be routed to respective columns and rows of interconnected capacitive-sensing nodes 113. The border areas 117 and 118 are not placed over the active portion 110 and generally do not function as part of an active area of the touchscreen panel 100. As a result, an inactive border region 123 (also referred to as a border) surrounds the active portion 110 of the touchscreen panel 100, thereby limiting the available portion of the touchscreen panel 100 to be used for touch sensing and/or display purposes.

Figure 2:
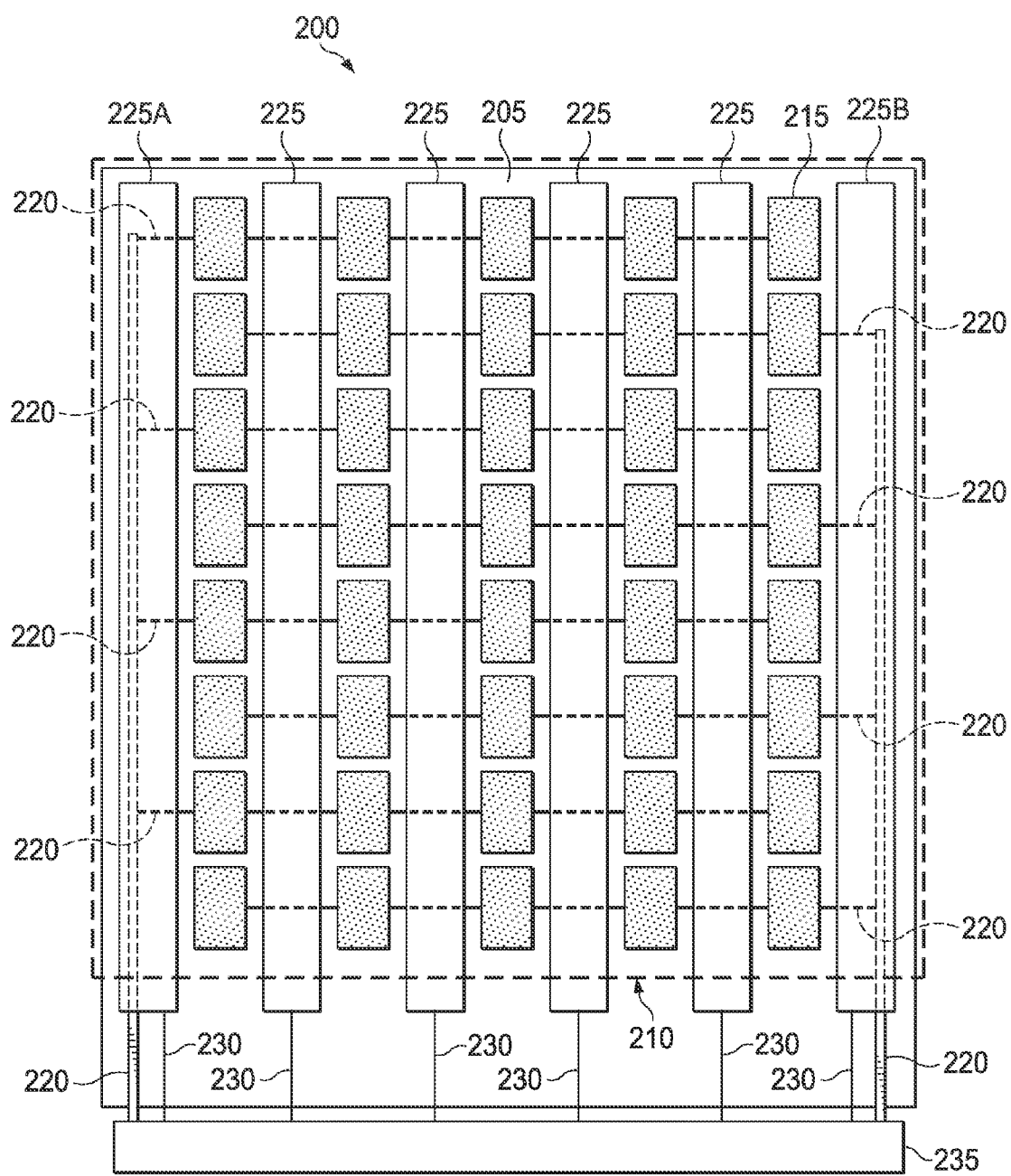
FIG. 2 illustrates an example of a borderless touchscreen panel.

FIG. 2 illustrates an embodiment of a touchscreen panel 200 that may be incorporated in an electronic device such as a smart phone, GPS device, tablet computer, mobile media player, remote control device, or any other devices capable of implementing a touchscreen panel. The touchscreen panel 200 includes an active portion 210 capable of displaying content and detecting a user touch (e.g., finger, stylus, etc.). As further explained below, the touchscreen panel 200 illustrated in FIG. 2 lacks the aforementioned inactive border region along all but one side of the active portion 210. Therefore, the touchscreen panel 200 is referred to hereinafter as a borderless touchscreen panel.

The borderless touchscreen panel 200 includes first and second conductive layers separated by a dielectric layer 205. The first conductive layer includes rows of series-connected capacitive sensors 215 and receiving traces 220, and the second conductive layer includes sensor bars 225 and transmitting traces 230, the sensor bars 225 extending along columns crossing over each of the rows of capacitive sensors 215. The capacitive sensors 215, receiving traces 220 and sensor bars 225 are generally disposed within the perimeter of the active portion 210 of the borderless touchscreen panel 200. Each row of capacitive sensors 215 is coupled to control circuitry 235 via the receiving traces 220, and each of the sensor bars 225 are coupled to the control circuitry 235 via the transmitting traces 230. The control circuitry 235 may include circuitry for providing a voltage or current to the second conductive layer (via the transmitting traces 230) and for receiving signals from the first conducting layer (via the receiving traces 220). The control circuitry 235 may also include logic circuitry for processing signals and conveying touch information to other parts of the electronic device, such as a processor.

Because the sensor bars 225, and more particularly outer sensor bars 225A and 225B, are disposed over the receiving traces 220, the receiving traces 220 are able to be routed within the active portion 210 of the panel 200 without obstructing the touch-detection capabilities of the active portion 210 of the borderless touchscreen panel 200. Furthermore, the receiving traces 220 (as well as other components of the panel 200) are comprised of a transparent material such as, for example, indium tin oxide (ITO), and therefore do not obstruct the display capabilities of the active portion 210. As such, there is no need for an inactive border region surrounding the active portion 210 of the borderless touchscreen panel 200 as the receiving traces 220 may be disposed within the active portion 210 without obstructing either the touch-detection or display capabilities of the borderless touchscreen panel 200. As such, a borderless touchscreen panel, such as that illustrated in FIG. 2, may exploit the space dedicated to the touchscreen panel by not requiring additional room for an inactive border region. Thus, the active area of a borderless touchscreen panel may be larger than the active area of a bordered touchscreen panel that would otherwise be installed in a particular device.

Figure 3:
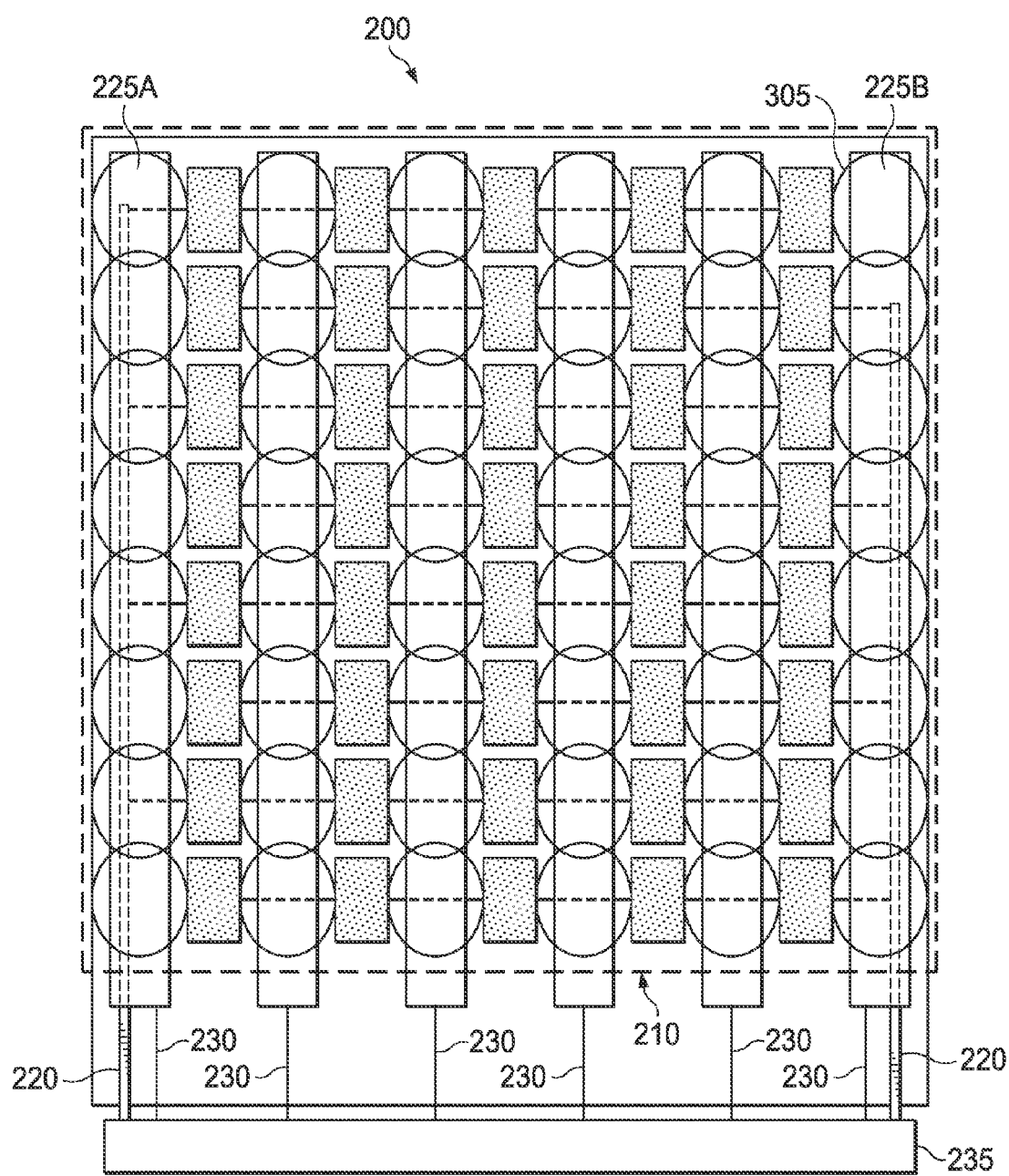
FIG. 3 illustrates a matrix of nodes that may be sensed to detect a user touch within an active portion of the borderless touchscreen panel of FIG. 2.

Referring now to FIG. 3, the borderless touchscreen panel 200 provides a matrix of nodes 305 that may be sensed to detect a user touch within the active portion 210 of the borderless touchscreen panel 200. In general, the control circuitry 235 measures a capacitance at each of the nodes 305 to determine the location of the touch. This is accomplished by applying a drive signal to the transmitting traces 230 connected to columns of sensor bars 225, and receiving a signal from the receiving traces 220 connected to the capacitive sensors 215. The control circuitry 235 then measures, or senses, the capacitance at each of the nodes 305 to detect the location of the touch. As will be understood by those of ordinary skill in the art, the detection of the touch can be utilized in various ways. For example, in response to detecting the touch, the control circuitry 235 may perform a particular action or generate a signal for controlling other circuitry for performing an action responsive to the touch.

Figure 4A:
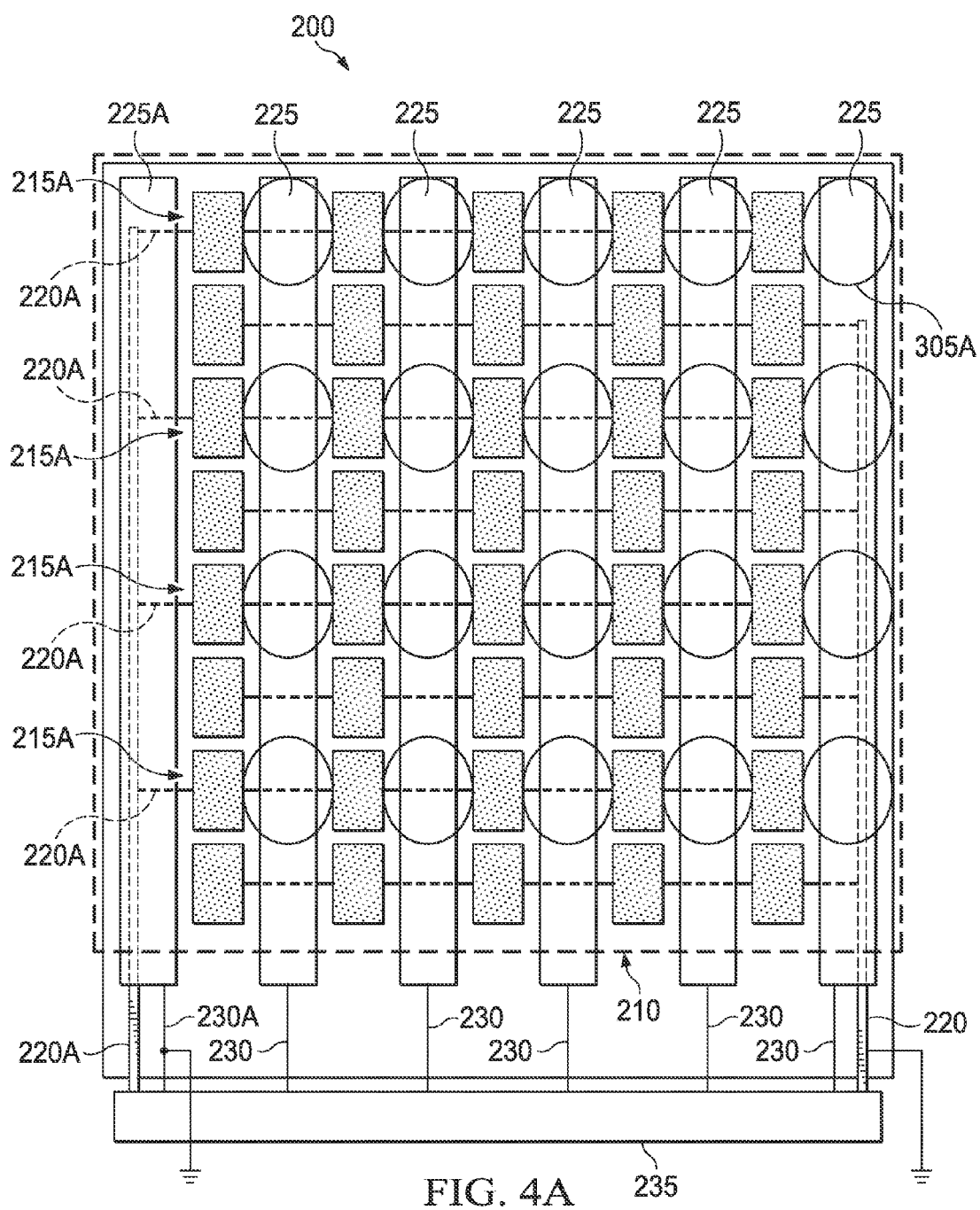
FIG. 4A illustrates the borderless touchscreen panel of FIG. 2 during a first phase of a two-phase, interlaced scanning method.
Figure 4B:
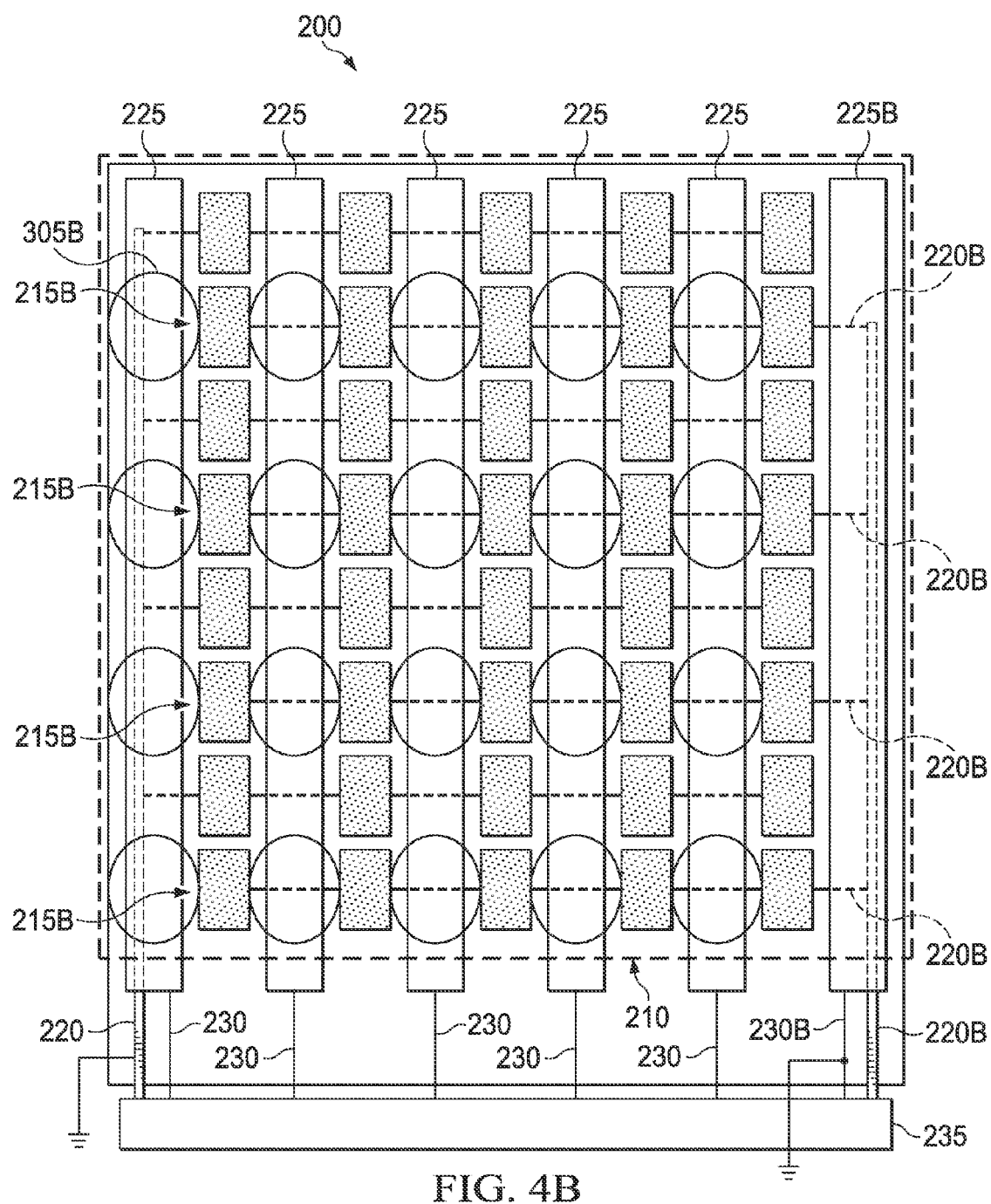
FIG. 4B illustrates the borderless touchscreen panel of FIG. 2 during a second phase of the two-phase, interlaced scanning method.

In some embodiments, the capacitance of each of the nodes 305 may be sensed in a particular order. For example, FIGS. 4A and 4B illustrate an example embodiment wherein the borderless touchscreen panel 200 is sensed using a two-phase, interlaced scanning method. In FIG. 4A, the borderless touchscreen panel 200 is shown during the first phase of scanning. During the first phase, a first set of nodes 305A are sensed by deactivating a first outer sensor bar 225 and sensing the rows of capacitive sensors 215 coupled to the receiving traces 220 routed beneath the inactive outer sensor bar 225. For example, in the embodiment illustrated in FIG. 4A, transmitting trace 230A is grounded and a drive signal is applied to the remaining transmitting traces 230. Accordingly, outer sensor bar 225A is inactive, and the remaining sensor bars 225 are active. The first set of receiving traces 220A, which are routed beneath the inactive sensor bar 225A, are sensed to measure the capacitance at the nodes 305A corresponding to the locations of the capacitive sensors 215A connected to the first set of receiving traces 220A.

FIG. 4B illustrates the borderless touchscreen panel 200 during the second phase of scanning. During the second phase, a second set of nodes 305B are sensed by deactivating the outer sensor bar 225 opposite the inactive sensor bar 225 of the first phase, and sensing the rows of capacitive sensors 215 coupled to the receiving traces 220 routed beneath the inactive outer sensor bar 225. For example, in the embodiment illustrated in FIG. 4B, transmitting trace 230B is grounded and a drive signal is applied to the remaining transmitting traces 230. Accordingly, outer sensor bar 225B is inactive, and the remaining sensor bars 225 are active. The second set of receiving traces 220B, which are routed beneath the inactive sensor bar 225B, are sensed to measure the capacitance at the nodes 305B corresponding to the locations of the capacitive sensors 215B connected to the second set of receiving traces 220B.

Figure 4C:
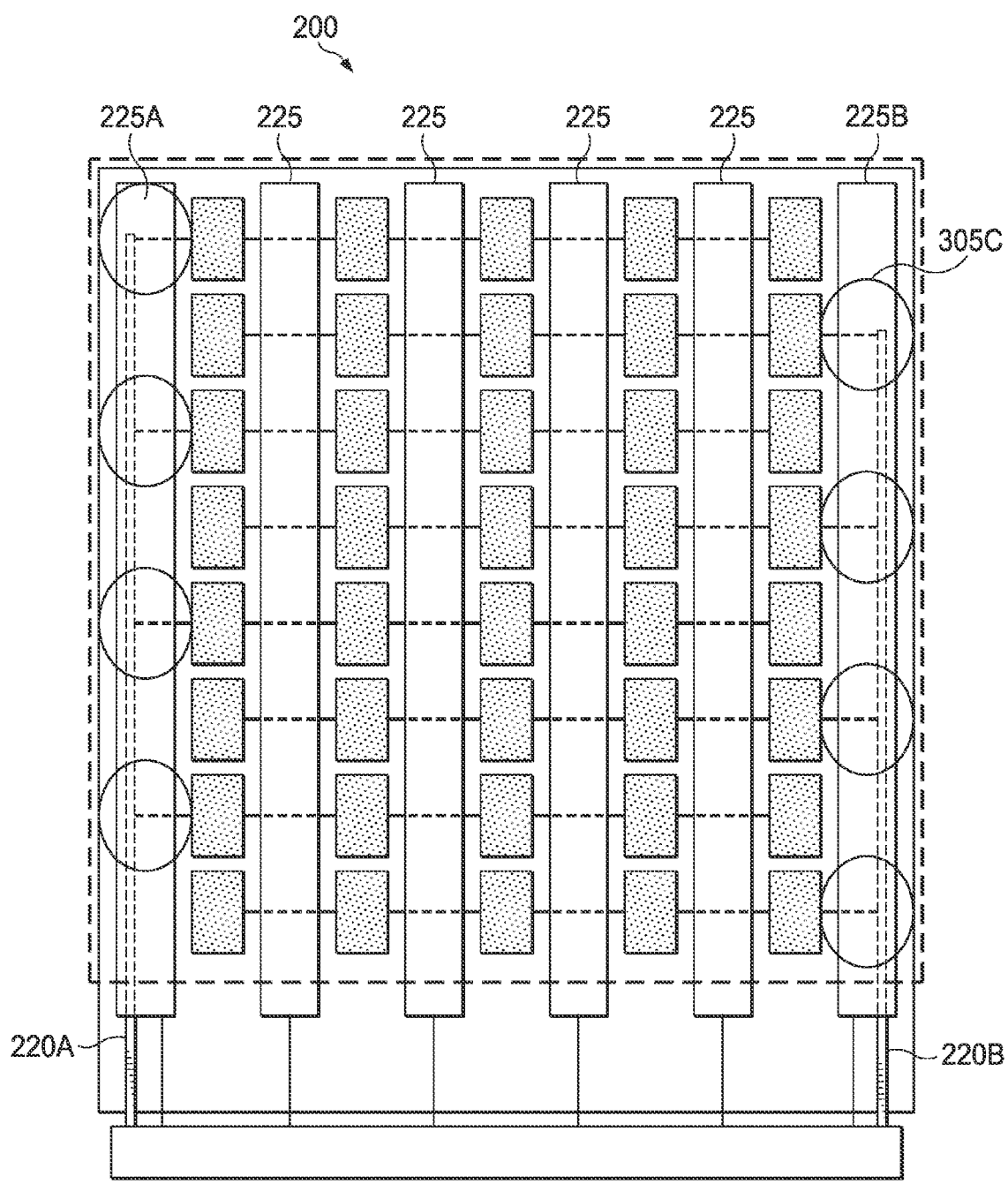
FIG. 4C illustrates the blind spots located above the inactive sensor bars during the two-phase, interlaced scanning method of the borderless touchscreen panel of FIG. 2.

Referring now to FIG. 4C, during the two-phase, interlaced scanning process, the inactive outer sensor bars 225 (i.e., sensor bar 225A during the first phase and sensor bar 225B during the second phase) are grounded, thereby creating a shielding layer for the portion of the sensed receiving traces 220 routed beneath the inactive sensor bar 225 (i.e., a portion of the first set of receiving traces 220A during the first phase and a portion of the second set of receiving traces 220B during the second phase). Accordingly, during each phase, nodes 305C located above the inactive outer sensor bar 225 incur a greater signal-to-noise ratio, which may affect the accuracy of (or block) touch detection in its corresponding location. Nevertheless, these nodes 305C (also referred to herein as "blind spots") may still be used in some embodiments to calculate the location of the user touch.

Figure 5:
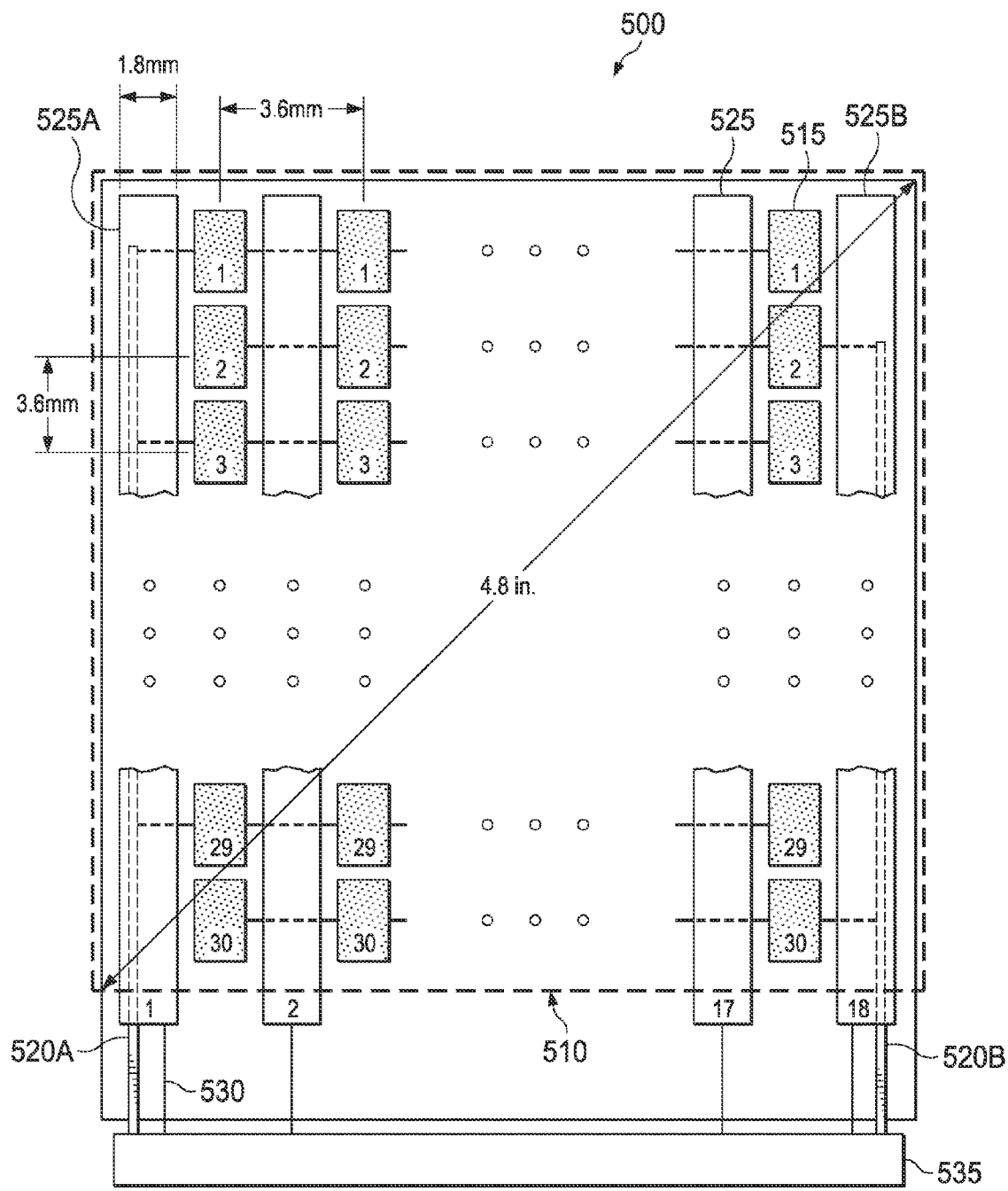
FIG. 5 illustrates an example embodiment of a borderless touchscreen panel having a reduced sensor pitch to compensate for reduced accuracy of blind spots.

In some embodiments, the reduction in touch detection accuracy at the blind spots may be compensated by reducing the sensor pitch for each column/row of sensors. By reducing the sensor pitch of the sensors provided in the touchscreen panel, the sizes of the blind spots are reduced and their corresponding impact on touch detection is also reduced. For example, FIG. 5 illustrates an example embodiment wherein the touchscreen panel 500 provides a reduced sensor pitch to compensate for the reduced accuracy of the blind spots. In the embodiment illustrated in FIG. 5 (not drawn to scale), the panel 500 has a 4.8 inch diagonal active portion 510. The panel 500 includes 30 rows of sensors 515 with a 3.6 mm sensor pitch and 18 sensor bars 525 each having a width of approximately 1.8 mm. Each row of sensors 515 is connected to control circuitry 535 via receiving traces 520 and each of the sensor bars 525 are connected to the control circuitry 535 via transmitting traces 530.

In accordance with the foregoing disclosure, a first set of the receiving traces 520A are routed beneath a first outer sensor bar 525A and a second set of the receiving traces 520B are routed beneath a second outer sensor bar 525B. Accordingly, a portion of the receiving traces 520A/520B connecting the rows of sensors 515 to the control circuitry 535 are routed within the 1.8 mm width of the outer sensor bar 225A/225B under which the respective receiving traces 520A/520B are disposed. When grounded, the outer sensor bars 525A and 525B provide shielding for the first and second sets of receiving traces 520A and 520B, respectively. However, by reducing the sensor pitch of the sensors 515 provided in the touchscreen panel 500, the sizes of the blind spots are reduced and their corresponding impact on touch detection is also reduced.

In some embodiments, resistance may be maintained for each row of sensors to ensure that capacitive sensing occurs properly for the disclosed touchscreen panel. For example, with further reference to the embodiment illustrated in FIG. 5, the resistance may be controlled to be 20 k-25 k ohm for each row of sensors 515. Assuming the receiving traces 520 are comprised of ITO having a 50 ohm sheet resistance at 1,000 sheets/mm for 50 µm of the trace, a receiving trace 520 of approximately 90 mm may have a resistance of approximately 22 k ohms.

The foregoing description has provided by way of exemplary and non-limiting examples a full and informative description of one or more exemplary embodiments of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

What is claimed is:

1. A borderless touchscreen panel, comprising:
   a plurality of transmit electrodes each extending in a first direction, the plurality of transmit electrodes including a first transmit electrode and a last transmit electrode;
   a plurality of sensing electrodes extending in a second direction perpendicular to the first direction, wherein a first subset of the plurality of sensing electrodes are coupled to receiving traces routed beneath the first transmit electrode and extending in the first direction along a length of the first transmit electrode, and a second subset of the plurality of sensing electrodes are coupled to receiving traces routed beneath the last transmit electrode and extending in the first direction along a length of the last transmit electrode; and
   control circuitry operable during a first mode to apply first drive signals to the plurality of transmit electrodes except the first transmit electrode and to receive first sense signals from the first subset via the receiving traces routed beneath the first transmit electrode.

2. The borderless touchscreen panel of claim 1, wherein the first sense signals are indicative of sensed capacitance at locations where the first subset of the plurality of sensing electrodes intersect the transmit electrodes.

3. The borderless touchscreen panel of claim 1, wherein the control circuitry is further operable during a second mode to apply second drive signals to the plurality of transmit electrodes except the last transmit electrode and to receive second sense signals from the second subset via the receiving traces routed beneath the last transmit electrode.

4. The borderless touchscreen panel of claim 3, wherein the second sense signals are indicative of sensed capacitance at locations where the second subset of the plurality of sensing electrodes intersect the transmit electrodes.

5. A borderless touchscreen panel, comprising:
   a first layer comprising rows of series-connected sensing electrodes;
   a second layer comprising a plurality of transmit electrodes, including a first transmit electrode and a last transmit electrode, each of the plurality of transmit electrodes extending in a first direction perpendicular to the rows of series-connected sensing electrodes,
   wherein the first layer further comprises:
      a first set of receiving traces routed beneath the first transmit electrode and extending in the first direction along a length of the first transmit electrode, the first set of receiving traces coupled to a first subset of the rows of series-connected sensing electrodes, and
      a second set of receiving traces routed beneath the last transmit electrode and extending in the first direction along a length of the last transmit electrode, the second set of receiving traces coupled to a second subset of the rows of series-connected sensing electrodes; and
   control circuitry operable during a first mode to apply first drive signals to the plurality of transmit electrodes except the first transmit electrode and to receive first sense signals from the first subset of the rows of series-connected sensing electrodes via the first set of receiving traces routed beneath the first transmit electrode.

6. The borderless touchscreen panel of claim 5, wherein the first sense signals are indicative of sensed capacitance at locations where the first subset of the rows of series-connected sensing electrodes intersect the transmit electrodes.

7. The borderless touchscreen panel of claim 5, wherein the second layer further comprises transmitting traces coupled to the plurality of transmit electrodes, the transmitting traces operable to transmit drive signals from the control circuitry to respective transmit electrodes.

8. The borderless touchscreen panel of claim 5, wherein the control circuitry is further operable during a second mode to apply second drive signals to the plurality of transmit electrodes except the last transmit electrode and to receive second sense signals from the second subset of the rows of series-connected sensing electrodes via the second set of receiving traces routed beneath the last transmit electrode.

9. The borderless touchscreen panel of claim 8, wherein the second sense signals are indicative of sensed capacitance at locations where the second subset of the rows of series-connected sensing electrodes intersect the transmit electrodes.

10. A borderless touchscreen panel, comprising:
a plurality of rows of series-connected sensing electrodes;
a plurality of transmit electrodes each extending in a first direction perpendicular to the rows of series-connected sensing electrodes, the plurality of transmit electrodes including:
a last transmit electrode, the last transmit electrode operable during a first mode to receive a first drive signal, and
a first transmit electrode, the first transmit electrode operable during a second mode to receive a second drive signal;
a first set of receiving traces routed beneath the first transmit electrode and extending in the first direction along a length of the first transmit electrode, the first set of receiving traces coupled to a first subset of the plurality of rows of series-connected sensing electrodes and operable during the first mode to provide first sense signals from the first subset of the plurality of series-connected sensing electrodes;
a second set of receiving traces routed beneath the last transmit electrode and extending in the first direction along a length of the last transmit electrode, the second set of receiving traces coupled to a second subset of the plurality of rows of series-connected sensing electrodes and operable during the second mode to provide second sense signals from the second subset of the plurality of series-connected sensing electrodes; and
control circuitry operable during the first mode to apply the first drive signal to the plurality of transmit electrodes except the first transmit electrode and to receive the first sense signals from the first set of receiving traces.

11. The borderless touchscreen panel of claim 10, wherein the first sense signals are indicative of sensed capacitance at locations where the first subset of the plurality of rows of series-connected sensing electrodes intersect the transmit electrodes.

12. The borderless touchscreen panel of claim 10, further comprising transmitting traces coupled to the plurality of transmit electrodes, the transmitting traces operable to transmit drive signals from the control circuitry to respective transmit electrodes.

13. The borderless touchscreen panel of claim 10, wherein the control circuitry is further operable during the second mode to apply the second drive signal to the plurality of transmit electrodes except the last transmit electrode and to receive the second sense signals from the second set of receiving traces.

14. The borderless touchscreen panel of claim 13, wherein the second sense signals are indicative of sensed capacitance at locations where the second subset of the plurality of rows of series-connected sensing electrodes intersect the transmit electrodes.

\* \* \* \* \*